United States Patent [19]

Brewer et al.

[11] 4,234,366
[45] * Nov. 18, 1980

[54] WALL AND FLOOR COVERINGS COMPRISING A SUBSTRATE FORMED FROM COMMINUTED, RECYCLED, FIBER-REINFORCED FOAM-CONTAINING SHEETS

[75] Inventors: Douglas M. Brewer, Dundee; Alan Mawson, Fife; William S. Carter, Kirkcaldy, all of Scotland

[73] Assignee: Nairn Floors Limited, Lune Mills, England

[*] Notice: The portion of the term of this patent subsequent to Oct. 24, 1995, has been disclaimed.

[21] Appl. No.: 940,791

[22] Filed: Sep. 1, 1978

Related U.S. Application Data

[63] Continuation-in-part of Ser. No. 761,195, Jan. 21, 1977, Pat. No. 4,122,224, which is a continuation-in-part of Ser. No. 639,519, Dec. 10, 1975, abandoned.

[30] Foreign Application Priority Data

Dec. 12, 1974 [GB] United Kingdom ............... 53709/74

[51] Int. Cl.$^2$ ........................ B29H 19/00; B32B 5/18; B32B 5/20; B32B 25/08
[52] U.S. Cl. ....................... 156/79; 156/94; 260/2.3; 427/373; 428/95; 428/159; 428/204; 428/207; 428/308; 428/309; 428/315; 428/317; 428/325
[58] Field of Search ............... 428/95, 204, 207, 308, 428/309, 315, 317, 325, 159; 427/373; 156/78, 79, 94; 260/2.3

[56] References Cited

U.S. PATENT DOCUMENTS

| | | | |
|---|---|---|---|
| 3,616,029 | 10/1971 | Lerman | 156/276 |
| 4,020,020 | 4/1977 | Appleyard et al. | 260/2.3 |
| 4,029,839 | 6/1977 | Lesti | 438/306 |
| 4,037,013 | 7/1977 | Spragul | 428/306 |
| 4,105,593 | 8/1978 | Stravrinou | 260/2.3 |
| 4,122,224 | 10/1978 | Brewer et al. | 428/306 |
| 4,158,646 | 6/1979 | Benkowski et al. | 260/2.3 |

*Primary Examiner*—James C. Cannon
*Attorney, Agent, or Firm*—Lawrence Rosen; E. Janet Berry

[57] ABSTRACT

Floor or wall covering is provided and comprises a decorative opaque surface layer bonded to a sheet backing obtained by comminuting, softening and resheeting a sheet material comprising a fibrous reinforcement, a layer of foamed vinyl resin and pigmented decoration. The fibrous reinforcement is normally of glass fibres and particulate inorganic filler is incorporated into the mass that is resheeted.

14 Claims, No Drawings

WALL AND FLOOR COVERINGS COMPRISING A SUBSTRATE FORMED FROM COMMINUTED, RECYCLED, FIBER-REINFORCED FOAM-CONTAINING SHEETS

This application is a continuation-in-part of our copending application Ser. No. 761,195 filed Jan. 21, 1977, now U.S. Pat. No. 4,122,224 which is a continuation-in-part of our now abandoned application Ser. No. 639,519 filed Dec. 10, 1975.

The entire subject matter of our application Ser. No. 761,195 filed Jan. 21, 1977 is herein incorporated by reference.

We describe in that application floor or wall coverings comprising a decorative opaque surface layer bonded to a backing sheet consisting essentially of a sheeted mass of particles of a sheet material, said sheet material comprising a foamed layer of vinyl resin, pigmented decoration and a wear layer over the foamed layer, and reinforcement selected from reinforcing fibres in the foamed layer and fibrous support beneath the foamed layer. Hereinafter we refer to the backing sheet as a substrate sheet. As described in that application the sheeted mass of particles may be made by comminuting the said sheet material into a mass of particles, and forming the softened mass into the substrate sheet. Thus within the substrate sheet the sheeted mass of particles consist of a substantially homogeneous mixture of the resin and fibres and pigment of the initial sheet material.

A method according to the invention for making a floor or wall covering comprises making a sheet material comprising fibrous reinforcement, a layer of foamed vinyl composition and pigmented decoration wherein the fibrous reinforcement is selected from reinforcing fibres in the foamed layer and fibrous supports beneath the foamed layer, comminuting this sheet into a mass of particles, softening the mass of particles, forming the softened mass into a substrate sheet, and bonding a decorative opaque surface layer to the substrate sheet.

Normally the sheet material that is comminuted includes also a wear layer over the foam layer and often the foamed layer has an embossed profile, this having been formed by mechanical embossing or by printing different vinyl compositions and foaming some or all of them or by foaming a sheet of a single composition and printing on to the sheet a material that will cause different degrees of foaming. Suitable methods are described in British Patent Specification Nos. 1,069,998, 1,147,983, 1,150,902 and U.S. Pat. No. 2,920,977, the subject matter of all of which is herein incorporated by reference.

The sheet material that is comminuted in the invention is normally material that has been produced, for instance in accordance with the description in one or more of these patent specifications, and has been observed by visual inspection to be of inferior quality, and is thus rejected. The pigmented decoration in the sheet material is generally provided in a multicolour complex pattern that in practice is applied in two or more different printing operations. As a result there is a considerable risk of parts of the pattern being out of register with each other. Accordingly it is standard in the manufacture of cushioned vinyl floor coverings to inspect the final decorative product and to reject all inferior quality material, usually because of faults arising solely in the appearance of the decorative layer. Depending upon the standards applied some of the "rejected" material may be usable as floor covering in some situations, but some at least of it will be wholly unsaleable. With products formed of a homogeneous composition, for example non-foamed floor coverings consisting solely of vinyl materials, it is relatively easy to melt the product down and re-cycle it as feedstock for the floor covering. However this cannot be done in practice with cushioned vinyl floor coverings because of the components in such materials, and at present no real use has been devised for rejected decorative cushioned vinyl wall and floor coverings. Accordingly prior to the invention relatively large volumes of inferior quality material are being destroyed or dumped every day, and the economics of the production of such materials are traditionally calculated to allow for this wastage, which over many years has been accepted as necessary. In the invention this material that would have been dumped is reused, after comminution and resheeting in the desribed manner. Thus the substrate material is formed from material that is dumped or destroyed so that the manufacturer will have costed his process in such a way that this rejected material has no value to him. Accordingly the manufacturer uses this material which involves no extra cost to him, as backing instead of having to buy in backing material, or material from which backing material can be made. Thus by combining the two processes, i.e. the production of the initial cushioned vinyl floor or wall covering material having a decorative surface with the production of a backed floor or wall covering having an opaque decorative surface, he is able to achieve large economies.

As described in application Ser. No. 761,195 the fibrous reinforcement is often of asbestos fibres. Thus there may be asbestos fibres in the foam or there may be a substrate of resin impregnated asbestos beneath the foam. Sheet material including fibrous reinforcement may be comminuted, generally to pieces having an average dimension of from 3 to 10 mm and softened usually by heating and mechanical working and generally after comminution, both so as to facilitate subsequent formation of the mass into a sheet and to help eliminate blowing agent that may remain in it. The softened comminuted mass may be formed into a sheet in any convenient manner, for example by extrusion or by use of calender rolls. Preferably polymeric material is incorporated into the mass before sheeting, this generally having the particular advantage of causing the resultant substrate sheet to have a smoother surface. This additional polymer may be incorporated into the mass either after softening of all the particles or before softening or may be comminuted with the sheet material and softened into the mass. The additional polymer is generally a vinyl polymer, for example a vinyl chloride polymer. The amount added is generally below 30% by weight, usually 5 to 25% and preferably 10 to 20% e.g. 15% by weight of the mass. These weights are of the polyvinyl chloride or other polymer composition incorporating any plasticiser that is initially present in it.

To increase the stability of the substrate sheet it may be desirable to include in the mixture at this stage a small amount of reinforcing material such as glass, cellulose or polyester fibres. The amount added is usually from 5 to 20% and preferably from 7 to 15% for example 10% by weight, based on the weight of the reject material. Alternatively, the sheet, when formed, may be laminated to a stabilising scrim such as a non-woven glass fibre tissue or glass/synthetic or natural fibre tissue. The stabilising scrim may be adhered to one surface of the reconstituted sheet, or sandwiched between two such sheets. Suitable scrims are described in U.S. patent application Ser. No. 686,435, now U.S. Pat. No. 4,138,521, and South African published Specification No. 75/7137.

Preferably the fibrous reinforcement of the sheet material that is to be comminuted is itself a glass fibrous reinforcement. Thus this sheet material may comprise a layer of foamed vinyl resin having embedded within it glass fibres as a reinforcement or may comprise a glass fibre support. This glass fibre support will generally be a non-woven glass fibre tissue in which the fibres are bonded with resin and additional resin is applied, for example as described in the aforesaid U.S. patent application Ser. No. 686,435 or South African application No. 75/7137.

When the sheet material that is to be comminuted does have glass fibre reinforcement it has surprisingly been found that the sheet substrate finally obtained does not have optimum properties for use as a substrate of floor or wall coverings, especially those in which the opaque surface layer is of a vinyl resin, but that this deficiency can be cured if inorganic particular filler is incorporated into the softened mass, either by addition to the mass immediately prior to sheeting, or prior to softening of the particles or it may be incorporated simultaneously with the comminution of the sheet. The particulate filler may be incorporated in the final desired particulate form or may be incorporated in a larger size and itself may be comminuted during comminution of the sheet and/or softening and/or resheeting of the mass. For instance it may be introduced as fibrous foam, for instance as glass fibres, and the processing conditions may then be operated in such a manner as to reduce the glass fibres to particulate form, e.g. to fibres less than 2 mm long. Normally, however, the filler is introduced initially in the form of particles having a dimension typical of the dimensions of fillers for plastics compositions. Thus its particle size is generally from 50 to 300 microns. Examples of suitable fillers are calcium carbonate, dolomite, marble and clay.

The comminution, softening and sheeting steps will result in degradation of the fibres in the initial glass fibrous reinforcement such that in the final product these fibres will themselves be degraded down to a maximum size generally of 2 mm or less. The total amount of these fibres and of the added inorganic reinforcement is generally from 30 to 75% by weight of the mass (i.e. the material that is sheeted) with best results being obtained at about 40 to 60%. Preferably the amount of inorganic particulate filler that is added in order to achieve these total values is from 20 to 150% by weight on the initial mass.

The highly viscous sheet containing comminuted fibres, added filler, vinyl resin from the initial sheet material and optionally additional vinyl resin may be sheeted by use of, for example, calender rolls to form the final substrate and if desired a layer free of fibres, for instance consisting solely of polymer (generally a vinyl chloride polymer) and plasticiser may be applied over the sheet material in order to improve its surface properties.

The substrate sheet will generally have a thickness of 0.3 to 7 mm, preferably 0.5 to 2.5 mm e.g. about 1 mm and a weight of from 530 to 2000 g/m$^2$, preferably about 670 to 1700 g/m$^2$, e.g. about 1400 g/m$^2$.

As described in application Ser. No. 761,195 the opaque surface layer that is bonded to the sheet may be a fibrous product preferably a non-woven product, for example tufted, flocked or needled. Suitable fibrous layers are 1 to 10, usually 1 to 5 mm thick and generally weigh from 1 to 1000, preferably 100 to 500 g/m$^2$. They may be bonded to the substrate sheet by fusion of the surface of the sheet and/or by the use of an adhesive, for instance a hot melt adhesive. Suitable methods and materials are described in application Ser. No. 761,195. Preferably, however, the opaque surface layer comprises a layer of a vinyl resin and a pigmented decoration and wear layer. The vinyl resin layer may be non-foamed but preferably it is foamed. It may be preformed and then laminated to the substrate sheet, e.g. by fusion or an adhesive but preferably is formed insitu on the sheet. Thus when the layer of vinyl resin is to be a foamed resin it is preferably bonded to the substrate sheet by depositing a layer of foamable resin on the substrate and subsequently foaming the layer, generally after printing pigmented decoration on to it and applying wear layer material, the application of the pigmented decoration and the wear layer being by conventional methods. The foamable material in the opaque surface layer is preferably provided with an embossed profile. This may be provided by mechanically embossing the foamed layer after foaming, for example to give a random overall emboss effect in known manner, or by incorporating inhibitor for foaming in known manner or by printing differently foamable compositions in known manner. The wear layer may be of vinyl resin or of a polyurethane.

The total weight of foamable composition, pigmented composition and wear layer applied over the substrate is generally from 200 to 1000 g/m$^2$, most preferably about 600 g/m$^2$. The maximum thickness after foaming of the foamed layer and wear layer is preferably from 0.3 to 2.5 mm, most preferably about 1.0 mm.

The final sheet may be used in sheet form or may be cut into tiles. Products of the invention have the particular merit that their substantially uniform distribution of plasticiser throughout their thickness means that they have much lower tendency to curl than many conventional substrates coated with a vinyl chloride resin layer.

The following are some examples of the invention.

EXAMPLE 1

Cushioned vinyl floor covering is made by a method generally as described in British Patent Specification No. 1,069,998 by depositing foamable resinous composition on an asbestos felt, printing a pattern of pigmented inks, some containing inhibitor that will alter the rate of foaming upon heating, and applying a thin transparent wear resistant layer and then heating the product to cause foaming and curing. At the final stages of manufacture this product is inspected and lengths that have blemishes in their decoration or other faults are cut out and rejected. These rejected lengths are roughly chopped and the particles mixed together in a high intensity mixer and the resultant hot mass is formed into a sheet at 170° C. on a two-roll mill. The sheet so produced is approximately 1.5 mm thick and quite cohesive but possesses a rough, uneven surface containing particles of imperfectly dispersed material arising from the backing of the cushioned vinyl floor covering. Without extensive use of levelling compositions the backing so produced is not sufficiently smooth to be used as a substrate on which to coat foamable plastisol.

The re-constituted sheet so formed is coated at 190 gm/m² with an adhesive comprising a plastisol produced from 100 parts of Corvic VP60/68 (a vinyl chloride copolymer available from I.C.I) and 80 parts of Pliobrac LTP (a plasticiser available from Albright & Wilson Ltd) and the coated plastisol is set and gelled by subjecting it to a current of hot air. The coated sheet is then passed, coating uppermost, at 2 meters/minute, 18 cm below a gas radiant heater, emitting heat at 60 Kwatts/m² onto the coating. Directly after the heater, the back of a needle web 1 is applied to the heated backing sheet in a laminating nip produced between two 25 cm diameter rolls, loaded to a pressure of 45 kg/cm of width. The needled web is a web of 40% polyester and 60% bi-component nylon fibres that has been formed and needled in conventional manner for making a needled carpet. It was then heated to 225° C. to achieve fusion of the outer component of the bi-component fibres and bonding of the needled web. This web weighed 400 g/m² and has a gauge of 2.5 mm. Thus it was too thin and insubstantial to use as a floor covering. However the final product of this web laminated to the resheeted mass is very satisfactory for use as a floor covering.

EXAMPLE 2

By analogy with Example 1, previously rejected cushioned vinyl floor covering and/or scrap material can be reconstituted into a form suitable for use as a backing for opaque decorative surface layers, by mixing the roughly chopped material in a high temperature, high shear, temperature-controlled mixing extruder, and then by milling the hot extruded composition and forming it into a sheet at 170° C. on a two-roll mill.

If, after milling, the softened composition is removed from the mill as a rough sheet and passed through a multi-roll calender, the gauge consistency and surface finish is improved. The calendered material is removed from the calender as a smooth-surfaced sheet, is cooled under controlled tension and wound into rolls for further processing. The sheet so produced has a gauge of 0.6 mm and has suitable properties e.g. tensile strength, dimensional stability and smoothness for use in the manufacturer of cushioned vinyl floor coverings or, as a base in the manufacture of hard printed vinyl products The reconstituted sheet so formed can then be coated by reverse roll coater or other means with 0.23 mm of a chemically foamable PVC plastisol such as any of the foamable compositions described in British Patent Specification No. 1,069,998. The coating is fused at 160° C., a temperature at which the coating can be gelled without decomposing the blowing agent, by passage through an air circulation oven.

The coated material is printed using solvent-based inks or plastisols, on a gravure printing press or rotary screen machine, some of the inksoptionally containing an inhibiting agent for the foaming reaction (following the teaching of British Patent Specification Nos. 1,069,998/9) if texture is required in the end product.

The printed material is then overcoated by reverse roll coater using a plastisol which cures to a hard transparent wear layer film, giving protection to the print layer in the finished product. After application of this plastisol, the material is passed through an air circulation oven at 200° C. to cure the coating and to cause foaming to occur. After leaving the hot air circulation oven, the material is cooled down before being rolled up.

The finished material made by this process may be used as sheet material (i.e. used in rolls) or may be cut into tiles. The material produced is of good surface appearance and physical properties and exhibited good dimensional stability and the ability to lay flat. In tile form especially, the material did not tend to exhibit curl along the edges of the tile as happens, for example, when asbestos felt substrates are used in tile production. When laid, the seams between each tile did not tend to open.

EXAMPLE 3

The process of Example 2 is repeated except that the following composition is added to the chopped material before mixing (the percentages are by weight based on the weight of chopped material):
1.7% Pigment—$TiO_2$
0.3% Lubricant—Barium Stearate
4.0% PVC—Vestolit 6867*
2.0% Plasticiser—Dioctyl phthalate
3.0% filler—ground limestone
1.0% Stabiliser
*Vestolit is a Trade Mark of Chemische-Werke Hüls.

After extrusion, the hot composition is further mixed and worked on a two-roll mill. After milling the softened composition is removed from the mill as a rough sheet and passed through a multi-roll calender to improve the gauge uniformity and surface finish. The calendered material is removed from the calender as a smooth surfaced sheet, is cooled under controlled tension and wound into rolls for further processing.

EXAMPLE 4

Example 3 is repeated except that, after leaving the calender the sheet is laminated to a stabilising scrim e.g. a non-woven glass/synthetic or natural fibre tissue. The stabilising scrim may be adhered to one surface of the reconstituted sheet, or sandwiched between two layers of the reconstituted sheet, in which case the layers are preferably of different thicknesses.

Alternatively, one sheet may be reconstituted material and the other of virgin stock.

Suitable scrims are described in U.S. patent application Ser. No. 686,435.

After lamination, the material is coated with a chemically foamable plastisol as described in Example 2, the coating being applied to the sheet face which does not carry the laminated scrim. A cushioned vinyl product is made as described above which is even more dimensionally stable and is especially suitable for use as a tile product.

EXAMPLE 5

A decorative embossed cushioned vinyl sheet material is made containing glass fibre reinforcement. Thus a glass tissue weighing 30 grams per square meter may be impregnated with vinyl resin as described in South African application No. 75/7137 and U.S. application Ser. No. 686,435 in an amount of about 200 grams per square meter and a cushioned vinyl floor covering may be made on this by a method generally as described in British Patent Specification No. 1,069,998 by depositing foamable resinous composition on it, printing a pattern of pigmented inks some which contain inhibitor that will alter the rate of foaming upon heating, applying a thin transparent wear resistant layer and then heating the product to cause foam and curing. Typically the resultant product contains per square meter 30 grams glass fibre, 600 grams vinyl resin (generally PVC), 20 grams pigment, 400 grams of filler (generally calcium carbonate) and 300 grams plasticizer.

Towards the end of manufacture the product is inspected and lengths that have blemishes in their decoration or other faults are cut out and rejected. These are chopped or torn into pieces having an average dimension of from 3 to 20 mm and 1320 grams of this particulate mass together with 1200 grams of calcium carbonate filler of particle size 100 microns and 100 grams of vinyl resin may be mixed together and fed to a compounding extruder or internal mixer of the Banbury type where they are mixed at a temperature of 170° C. and are finally extruded or taken from a mill as a sheet at 160° C.

The sheet may be passed through a multi roll calender to improve its surface smoothness and it may then have a gauge of 0.6 mm and a weight of 1100 g/m². Overall layer of foamable vinyl plastisol may be deposited by a reverse roll coater to a thickness of 0.3 mm and then gelled in a hot air oven at 160° C. A number of inks, one or more of which contain an inhibitor of the foam expansion process, may then be printed by gravure or screen printing and an overall layer of 0.16 mm PVC plastisol may then be applied as wear layer. The product is then passed through an oven at a temperature sufficient to cause foaming to give an embossed product, is then cooled and if desired may be cut into tiles. The final product may have a gauge of about 1.65 mm and weigh about 1875 g/m².

We claim:

1. A method of making a floor or wall covering comprising making a sheet material comprising fibrous reinforcement, a layer of foamed vinyl resin and pigmented decoration, wherein the fibrous reinforcement is selected from reinforcing fibres in the foamed layer and fibrous support beneath the foamed layer, comminuting this sheet into a mass of particles, softening the mass of particles, forming the softened mass into a substrate sheet and bonding a decorative opaque surface layer to the sheet.

2. A method according to claim 1 in which the opaque surface layer comprises a layer of vinyl resin and pigmented decoration and a wear layer.

3. A method according to claim 1 in which additional polymeric material is incorporated in the softened mass.

4. A method according to claim 1 in which the fibres of the fibrous reinforcement comprise glass fibres and an inorganic filler is incorporated in the softened mass.

5. A method according to claim 1 in which the opaque surface layer comprises a layer of foamed vinyl resin and pigmented decoration and wear layer.

6. A method according to claim 5 in which the opaque surface layer is bonded on to the substrate sheet by a method comprising depositing on to the substrate sheet a layer of foamable vinyl resin composition and subsequently foaming this.

7. A method according to claim 6 in which the foamed layer possesses, after foaming, an embossed profile.

8. A method according to claim 6 in which, after foaming the foamed layer is mechanically embossed.

9. A method according to claim 1 comprising making a sheet material comprising glass fibre reinforcement, a layer of foamed vinyl resin and pigmented decoration and a wear layer over the foam layer wherein the glass fibre reinforcement is selected from glass reinforcing fibres in the foamed layer and a glass fibrous support beneath the foamed layer, comminuting this sheet into a mass of particles, softening the mass of particles, incorporating into the mass of particles 5 to 30% by weight of the mass of polymeric material and 20 to 150% by weight of the mass of inorganic filler, forming the softened mass into a substrate sheet, depositing a foamable vinyl resin composition on to the substrate sheet, applying pigmented decoration and a wear layer and foaming the foamable composition.

10. A method according to claim 9 in which the amount of glass fibre introduced to the mass as reinforcing fibres in the said sheet material and the amount of filler incorporated into the mass together totals from 30 to 75% by weight of the mass.

11. Floor or wall covering formed by the method of claim 1 comprising a decorative opaque surface layer bonded to a substrate sheet.

12. Covering according to claim 11 in which the sheet formed from the mass of particles includes also 5 to 30% by weight additional polymeric material and 30 to 75% by weight of inorganic particulate filler.

13. Covering according to claim 11 in which the decorative opaque surface layer is a layer of decorative pigmented vinyl material.

14. Covering according to claim 11 in which the decorative opaque surface layer comprises an embossed foamed vinyl layer carrying a pigmented decoration.

* * * * *